United States Patent [19]

Szoboszlay

[11] Patent Number: 6,046,555
[45] Date of Patent: Apr. 4, 2000

[54] SYSTEM AND METHOD FOR DETERMINING A MAGNETIC OFFSET OF A BRUSHLESS DC MOTOR

[76] Inventor: Gabor Szoboszlay, 801 N. Humboldt, #307, San Mateo, Calif. 95521

[21] Appl. No.: 09/156,772

[22] Filed: Oct. 23, 1998

[51] Int. Cl.⁷ .................................................. H02P 6/12
[52] U.S. Cl. ...................... 318/254; 318/439; 318/721
[58] Field of Search ........................... 318/138, 254, 318/439, 700, 720, 721

[56] References Cited

U.S. PATENT DOCUMENTS

| | | |
|---|---|---|
| 4,490,661 | 12/1984 | Brown et al. . |
| 4,633,150 | 12/1986 | Inaji et al. . |
| 4,752,724 | 6/1988 | Radziwill et al. . |
| 4,942,344 | 7/1990 | Devitt et al. . |
| 5,159,246 | 10/1992 | Ueki . |
| 5,189,349 | 2/1993 | Haga . |
| 5,350,984 | 9/1994 | Carobolante et al. ................... 318/254 |
| 5,350,987 | 9/1994 | Ueki . |
| 5,600,218 | 2/1997 | Holling et al. . |
| 5,708,337 | 1/1998 | Breit et al. . |
| 5,838,122 | 11/1998 | Vu ......................................... 318/254 |

*Primary Examiner*—Bentsu Ro
*Attorney, Agent, or Firm*—Finnegan, Henderson, Farabow, Garrett & Dunner L.L.P.

[57] ABSTRACT

A closed-loop system is implemented during startup for accurately determining the magnet offset between a set of magnets and a set of windings of a brushless DC motor. The determined magnetic offset value is used to align a position sensor to the actual angular distance between the windings and the magnets. The alignment of the position sensor setting is in turn used to provide a commutation current that allows the motor to operate at maximum efficiency.

22 Claims, 6 Drawing Sheets

SYSTEM AND METHOD FOR DETERMINING A MAGNETIC OFFSET OF A BRUSHLESS DC MOTOR

BACKGROUND OF THE INVENTION

The present invention relates to the field of brushless DC motor control, and more particularly to a method and system for determining a magnetic offset of a brushless DC motor and for using the magnetic offset to provide a commutation current that allows the motor to operate at its highest efficiency.

Typically, brushless DC motors comprise a fixed stator with a number of windings and a moveable rotor with a set of magnets. Current passing though the windings, referred to as the commutation current, results in the production of an electromagnetic field. The field causes movement of the rotor magnets and an output force to be supplied by the motor. For the motor to perform efficiently, the commutation current used to provide excitation of the windings must be of the proper phase and value. A motor that is not supplied with the proper commutation current will be inefficient in converting current to force or torque, and may even operate in reverse.

To discover the amount and phase of the appropriate commutation current, the location of the rotor magnets with respect to the windings must be determined. A position sensor first determines the initial location of the magnets in relation to the poles of the motor. For incremental position sensors, the measured position value is an arbitrary distance when the sensor is initialized. For proper commutation, it is imperative that an offset value (i.e., the incremental distance) be determined so that the sensor position can be aligned to the actual poles of the magnets. This offset value is referred to as the "magnetic offset."

One method for aligning the position sensor to the actual location of the poles is to supply a three-phase current value to the windings using an arbitrary magnetic offset. The supplied current causes the motor to rotate with a certain force and in certain direction, depending upon the initial alignment of the windings and the magnets and the phase separation of the current supplied. The current supplied is a pulse and the same pulse is supplied in the opposite direction to avoid significant motor movement. Subsequent three-phase current pulses are then supplied, either lower or higher than the initial current setting, depending on the movement and force output by the motor. Excitation of the windings with the arbitrary successive magnetic offset values continues until a maximum force is output by the motor. Once the maximum force is achieved, the offset is saved for future commutation.

This procedure requires short current pulses to avoid unwanted motor movement. These pulses can not be too short, however, because measurement errors effecting the accuracy of the magnetic offset may result.

Offset determination is important because the force produced by the motor is a sinusoidal function of how accurately the magnetic offset is calculated. For example, if the error between the calculated and real magnetic offset is 3%, then the force produced by the motor will reach no higher than 98% of its maximum possible (and expected) force output. For an error of 7% the force output by the motor falls to 90%. FIG. 1 is a waveform representation of the relationship between a magnetic offset error and the force output by a sinusoidally commutated motor. As apparent in FIG. 1, the closer the magnetic offset error is to zero, the higher the force produced by the motor and the more efficiently it operates.

As such, it is desirable to reduce the magnetic offset error between the position detected by a sensor monitoring the distance between the magnets and windings, and the actual offset between the magnets and the windings. It is also desirable to quickly and accurately determine the magnetic offset so that a proper commutation current can be supplied to motor. It is further desirable that the determination of the magnetic offset occur with minimal movement and stress upon the motor. This determination should take place automatically without the need for continued monitoring of the power output by the motor.

It is therefore desirable to provide a solution that effective overcomes the problems and disadvantages associated with the related art.

SUMMARY OF THE INVENTION

Systems and methods consistent with the present invention meet these needs and offer other advantages by providing a closed loop system to a determine the magnetic offset value of a brushless DC motor. The closed loop system continuously supplies a three-phase current of constant amplitude through the motor windings. Instead of directly finding the desired magnetic offset that produces maximum force, systems and methods consistent with the present invention determine the offset value that produces a zero output force (i.e., placing the motor in a steady-state condition).

Further, systems and methods consistent with the present invention provide a more accurate and a faster stabilization of a brushless DC motor by quickly aligning a position sensor with the actual position of the motor's magnetic poles. The speed of the alignment permits the motor to operate more efficiently and produce the maximum amount of output force with less stress and movement during motor startup.

In accordance with the purpose of the invention as embodied and broadly described herein, a system consistent with the principles of the present invention is provided for controlling a brushless DC motor having a plurality of windings and a plurality of magnets. The system includes a position detection device configured to determine a magnetic offset value representing an angular distance between the rotor and the windings, and use the magnetic offset to allow the motor to output a maximum force. The position detection device includes: a commutation controller configured to provide a sinusoidal commutation signal to the plurality of windings, the commutation signal causing movement of the motor; and a lead filter, coupled to the commutation controller, configured to place the motor in a steady-state condition in response to a feedback signal. The system further includes a position sensor configured to receive a changing position signal resulting from movement of the motor, the changing position signal representing the distance between the magnet and the plurality of windings and corresponding to the feedback signal.

A method, consistent with the principles of this invention, is also provided for determining a magnetic offset of a brushless three-phase DC motor having a set of magnets and a set of windings. The method includes the steps of: providing a start position value to a sensor position input of a commutation controller; exciting the windings of the motor with a sinusoidal commutation signal output by the commutation controller, the commutation signal producing movement of the magnets; measuring a distance between the windings and the magnets resulting from the relative movement; and determining, in response to a position feedback signal, a second position value such that the commutation signal output by the commutation controller causes the motor to enter a steady-state condition.

The summary and the following detailed description should not restrict the scope of the claimed invention. Both provide examples and explanations to enable others to practice the invention.

BRIEF DESCRIPTION OF THE DRAWINGS

The accompanying drawings, which form part of the detailed description, show one embodiment of the invention and, together with the description, explain the principles of the invention.

DETAILED DESCRIPTION

The following description of implementation of this invention refers to the accompanying drawings. Where appropriate, the same reference numbers in different drawings refer to the same or similar elements.

Figure 1:
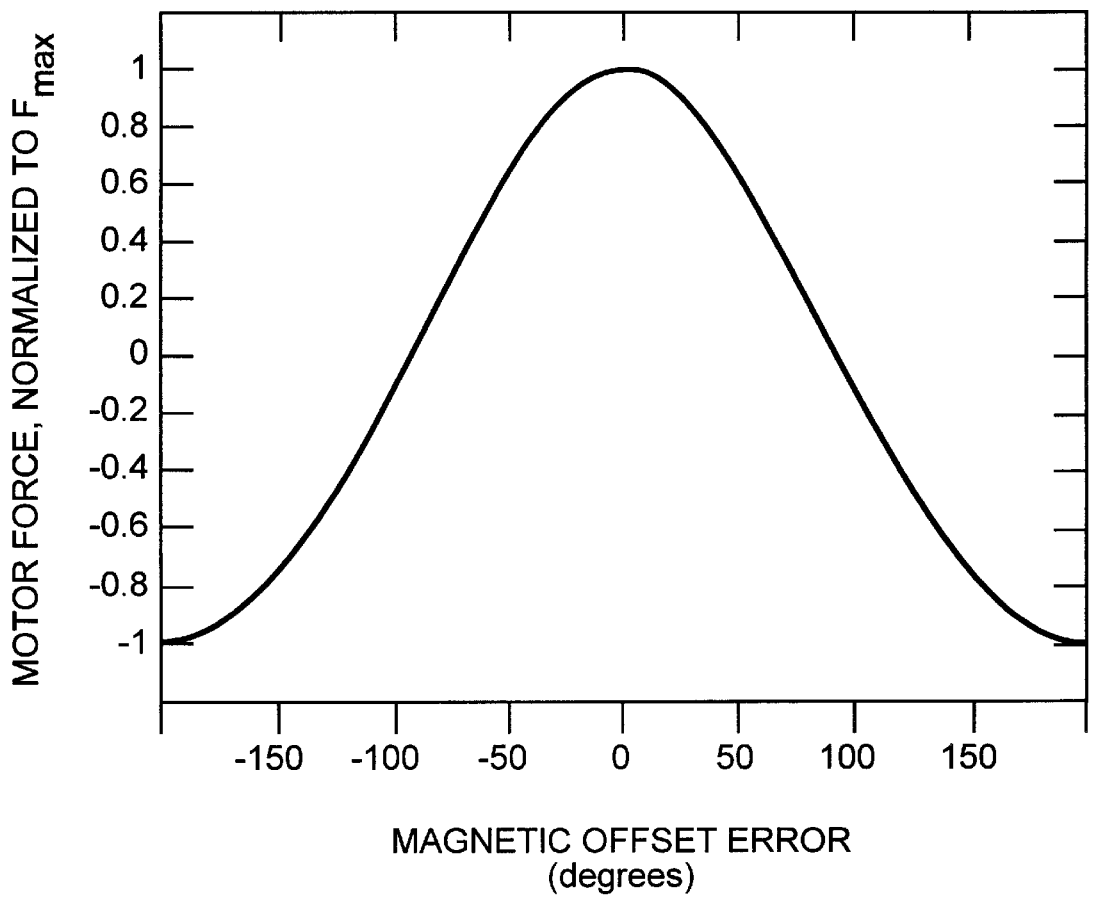
FIG. 1 is a waveform diagram showing a relationship between magnetic offset error and the force output by a brushless DC motor consistent with the invention.
Figure 2:
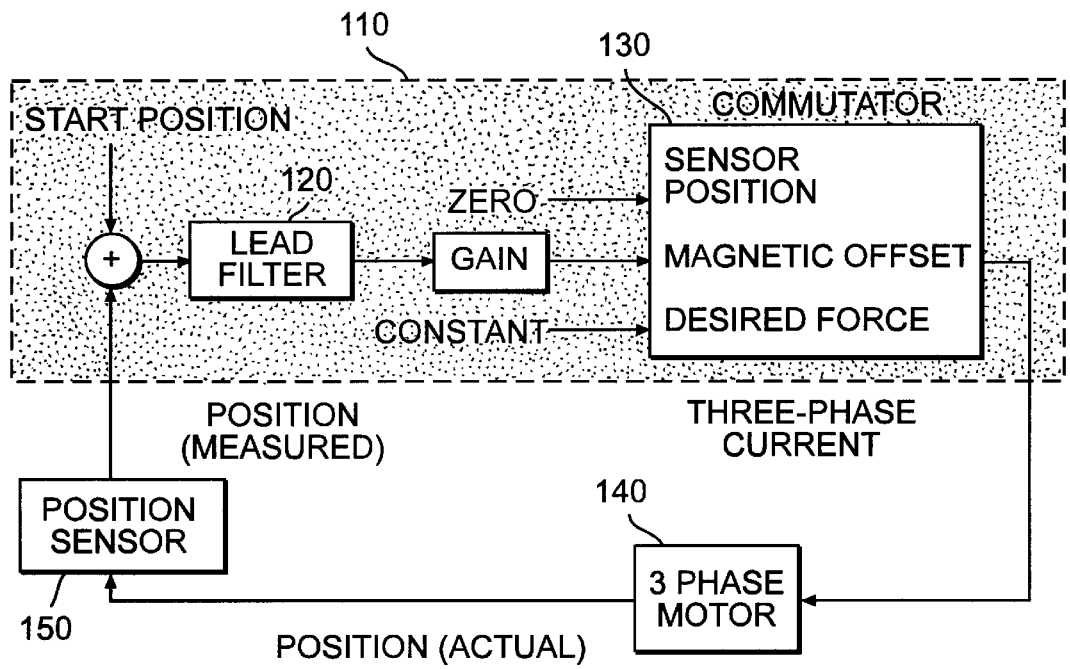
FIG. 2 is a block diagram of a system used for determining a magnetic offset constant of a brushless DC motor and using the magnetic offset to align a position sensor to the magnetic poles of the motor consistent with the invention.

FIG. 2 is a block diagram of a system 100 used for determining a magnetic offset constant of a brushless DC motor, and using the magnetic offset to align a position sensor to the magnetic poles of the motor consistent with this invention. System 100 includes a pole positioning device 100 coupled to a brushless, three-phase DC motor 140, and a position sensor 150 located to receive a position signal from motor 150. Pole positioning device 100 includes a lead filter element 120 coupled to a commutation controller 130 that outputs the commutation settings for motor 140.

In accordance with the present invention, the operation of pole positioning device 100 and the functions of its included components are software implemented. Preferably, a microprocessor, a digital signal processor (DSP), or like device, is programmed with the settings needed to implement lead filter element 120 and the functions of commutation controller 130. A PC/C31 DSP board from Spectrum Signal Processing Systems of Burnaby, Vancouver, B.C., Canada is an example of a DSP board that could be used to implement the systems and methods of the present invention. Preferably, the DSP board also includes peripheral devices, such as local memory components that can store input parameters, various control functions, and commands. As recognized by those skilled in the art, logic devices and discrete components could also be used to carry out the functions of pole positioning device 110.

In accordance with the present invention, motor 140 is a brushless, three-phase, linear DC motor that is capable of being sinusoidally commutated. Systems and methods consistent with the present invention are not limited to linear motors, but may be utilized with any polyphase brushless DC motor that is capable of operating with sinusoidal commutation.

In accordance with the present invention, a closed-loop technique is employed such that a three-phase current of constant amplitude is continuously flowing through the windings of motor 140. Systems and methods consistent with this invention determine the magnetic offset value that produces a zero output force from motor 140. In contrast, conventional techniques attempt to directly find the desired magnetic offset that produces a maximum force from the motor.

Preferably, commutation controller 130 provides a sinusoidal commutation input signal to motor 140. In other words, it converts the three inputs (1) sensor position, (2) desired output force, and (3) magnetic offset into a three-phase signal (phase 0, phase 120, and phase 240). This commutation signal provides the excitation current needed to generate an output force from motor 140.

Figure 3:
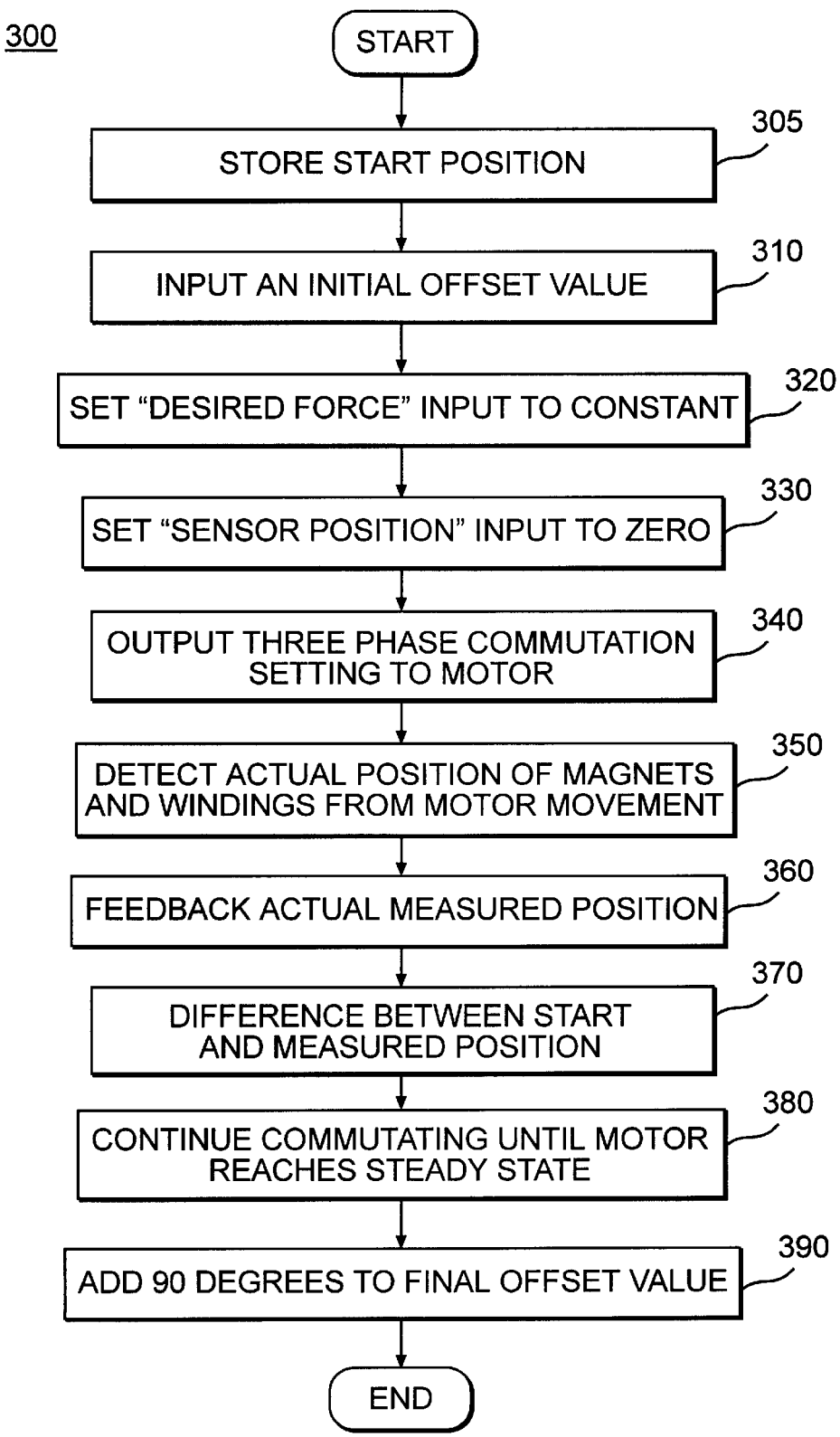
FIG. 3 is a flowchart of the major steps of a procedure for determining a magnetic offset constant of a brushless DC motor and using the magnetic offset to align a position sensor to the magnetic poles of the motor consistent with the invention.

FIG. 3 is a flowchart of the major steps of a procedure for determining a magnetic offset constant of a brushless DC motor, and using the magnetic offset to align a position sensor to the magnetic poles of the motor consistent with this invention. First, an initial guess for the magnetic_offset value is supplied to an offset input of commutation controller 130 (step 310). For convenience, an initial input of zero is chosen. Next, a "sensor position" input of commutation controller 130 is also supplied with a zero input level (step 320), and a "desired force" input of commutation controller 130 is set to a constant (step 330).

As a result of the three supplied inputs to commutation controller 130, a three-phase commutation signal of an arbitrary phase, in terms of motor's 140 magnetic poles, is produced (step 340). The three-phase signal is used to excite the windings of motor 140, causing motion in the same direction as the force of the commutation signal. With this motion, motor 140 outputs a changing position signal, representing the actual angular positional relationship between the magnets and windings of motor 140, that is detected by position sensor 150 (step 350). Position sensor 150 feeds this actual pole and magnet position reading to pole positioning device 110 (step 360).

Upon reaching pole positioning device 110, the angular position is filtered with lead filter element 120. Lead filter 120 outputs a gain signal to the input of commutation controller 130 that is essentially the difference between the measured sensor position value and the initial starting position value (step 370). The filtering operation of lead filter 120 is chosen such that the next magnetic offset value supplied to commutation controller 130 regulates the force of the motor to zero. In other words, the closed loop system continues to produce the difference signal until motor 140 reaches steady-state condition and the position stops changing, or equivalently, when the motor produces no more net force (step 380). Finally, a 90 degree value is added to the final offset value to convert it from a minimum force value to a maximum force value (step 390).

It should be noted that there are two equilibrium points where three-phase current flowing through motor 140 produces no force: a magnetic offset error of 0 and 180 degrees. The former is stable and the latter is unstable (corresponding to positive feedback), which means in practice that the steady-state solution is unique from −180 to 180 degrees. Any shift of 360 degrees is equally valid physically because it is exactly the distance of two magnet poles.

Mathematically, system 100 can be represented by the following:

$$\ddot{x} = \frac{F_{max}}{mass} \sin\left(\frac{2\pi(\phi - \phi_o)}{2 \text{ pole pitch}}\right)$$

where x is position, $\ddot{x}$ is acceleration, $\phi$ is the estimated magnetic offset (in the same units as position), $\phi_o$ is the actual magnetic offset. The pole pitch is the distance between the magnets and windings in angular units or degrees, and Fmax is the maximum force output by the motor.

In accordance with the present invention, lead filter 120 is configured to stabilize the closed loop system by providing the following response, C(s):

$$C(s) = \frac{\phi}{x - x_0} = \frac{\text{gain } 10^4(s + 10)}{(s + 10^2)(s + 10^3)}$$

whereby s is a complex frequency according to the Laplace Transform equation.

This equation shows that lead filter 120 has a zero at 10 rads and a pole at 100 rads. The other pole at 1000 rads reduces any high frequency noise. Those skilled in the art will recognize that the closed loop system in accordance with the present invention is nonlinear, making a simple eigenvalue analysis insufficient except near the two equilibrium points. Preferably, the value of the filter's gain is a tradeoff between worst-case position movement and sensitivity to noise.

If, for example, a DC gain of C(s) is set to 10.0 then the motor will move approximately ±180/10=±18 degrees from the initial position to a steady-state position. For a pole pitch of 34 mm, this translates into ±3.4 mm movement of the motor during the initial startup sequence.

Preferably, the closed-loop magnetic offset, $\phi$, reaches steady-state typically under half a second. The final equation for determining the offset is as follows:

magnetic_offset=wrap($x_{final}+\phi_{final}+90$)

where the notation wrap( ) indicates a reduction by any multiple of 360 degrees. In this equation, the final position value, $x_{final}$, is summed with the offset since zero is initially supplied to the position input of commutation controller 130 instead of the actual position. The 90 degree term in the above equation, or half a pole pitch, represents a shift from a minimum to a maximum force. Preferably, the final value is saved as the variable magnetic_offset, stored, and used in all future commutation calculations made by pole positioning device 110. This value is used to align position sensor 150 to the magnetic poles at motor startup.

Figure 4:
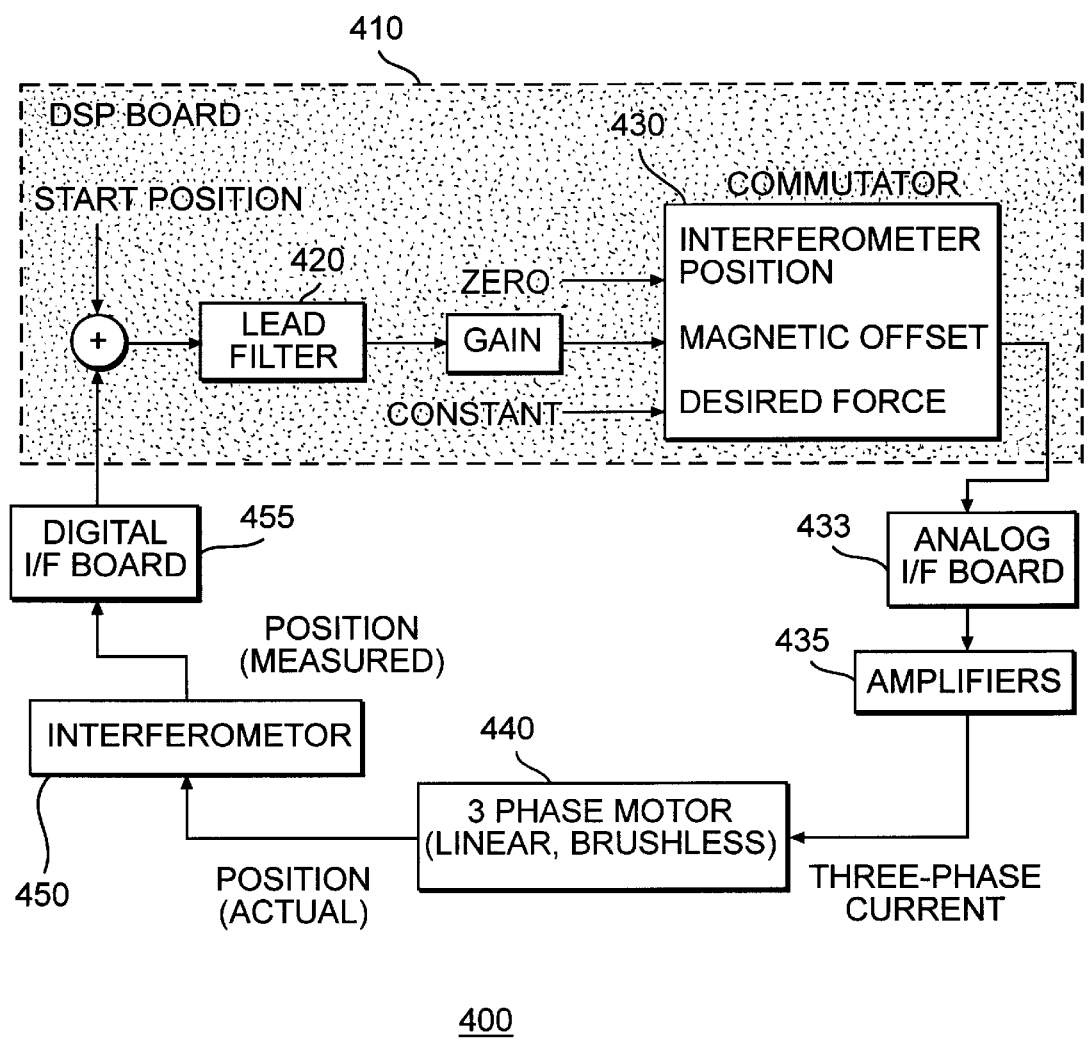
FIG. 4 is a block diagram of the major components of another embodiment consistent with the system of FIG. 2.

FIG. 4 is a second embodiment consistent with this invention. In FIG. 4, a system 400, which is shown and described for exemplary purposes only, includes the majority of the components shown in the first embodiment, with some additional elements for actual implementation. Preferably, this second embodiment is used in the field of semiconductor lithography and the components operate in the manner previously described.

In accordance with the second embodiment, a motor 440 is a brushless, linear DC motor used to control the movement of a semiconductor positioning table. Position sensor 150 of the first embodiment has been replaced with an interferometer 450. Interferometer 450 provides accurate optical readings for the position of the windings for this moving-coil motor. Also included in this embodiment are several interface and conditioning components to ensure compatibility between the various elements within system 400.

An analog interface (I/F) board 433, for example, converts the commutation signals from commutator controller 430 to three analog outputs. The analog signals are voltage signals output by an analog-to-digital convertor residing on analog (I/F) board 433. Upon receiving the three voltage signals from analog I/F board 433, an amplifier and signal conditioning board 435 converts the voltage levels to a current, amplifies the current, and supplies a three-phase commutation current to motor controller 440.

In this preferred embodiment, the output of interferometer 450 is a digital signal that is compatible with a standard VME digital bus. To communicate with the position detection device 410, the VME signal is converted by a digital I/F board 455 to a specific bus communication signal for the PC/C31 previously described. In this configuration, the bus used is DSPLINK.

Figure 5A:
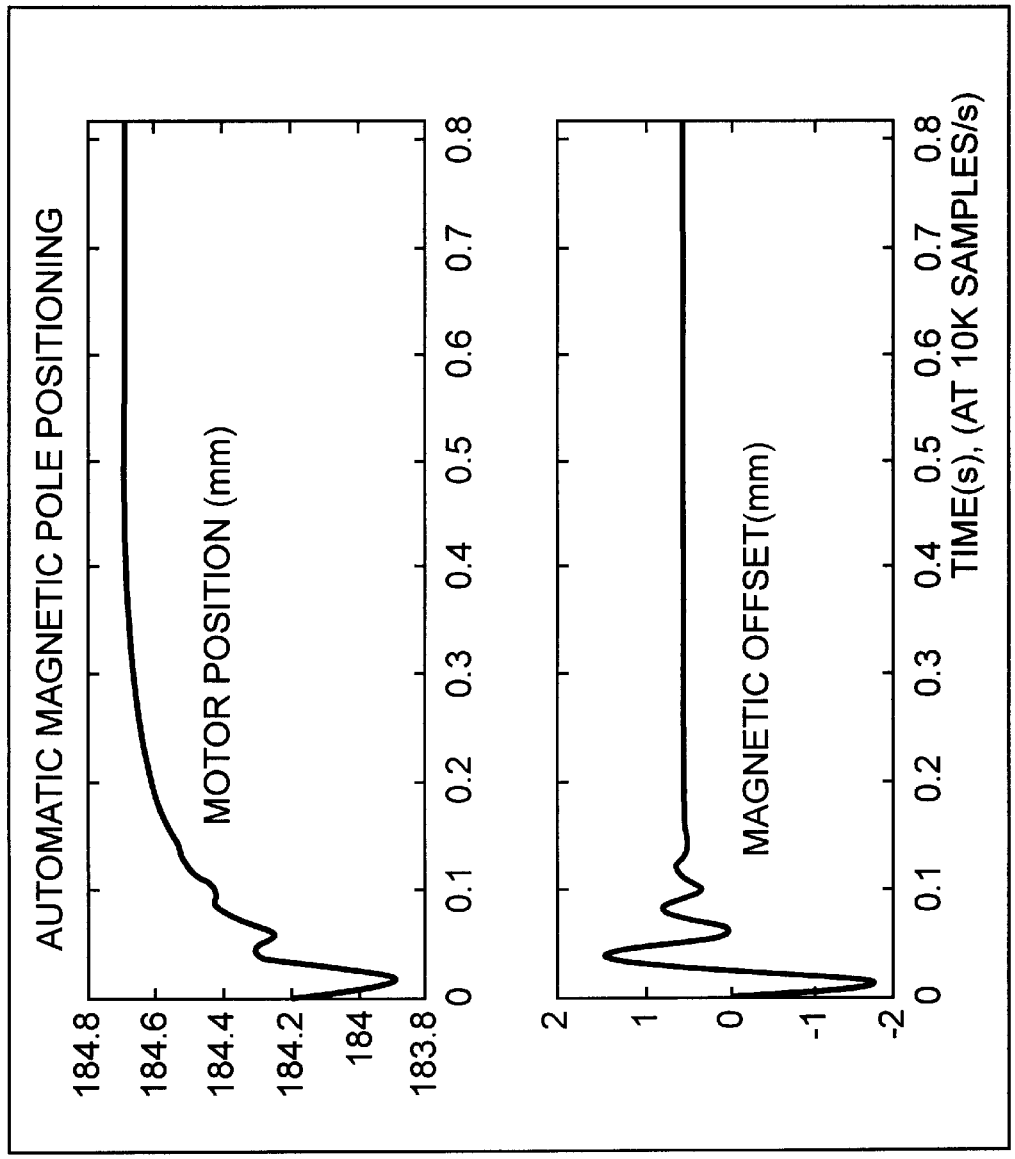
FIGS. 5A and 5B are waveform diagrams showing a relationship between linear position of a fixed-magnet and a track-moving winding motor upon startup consistent with this invention.
Figure 5B:
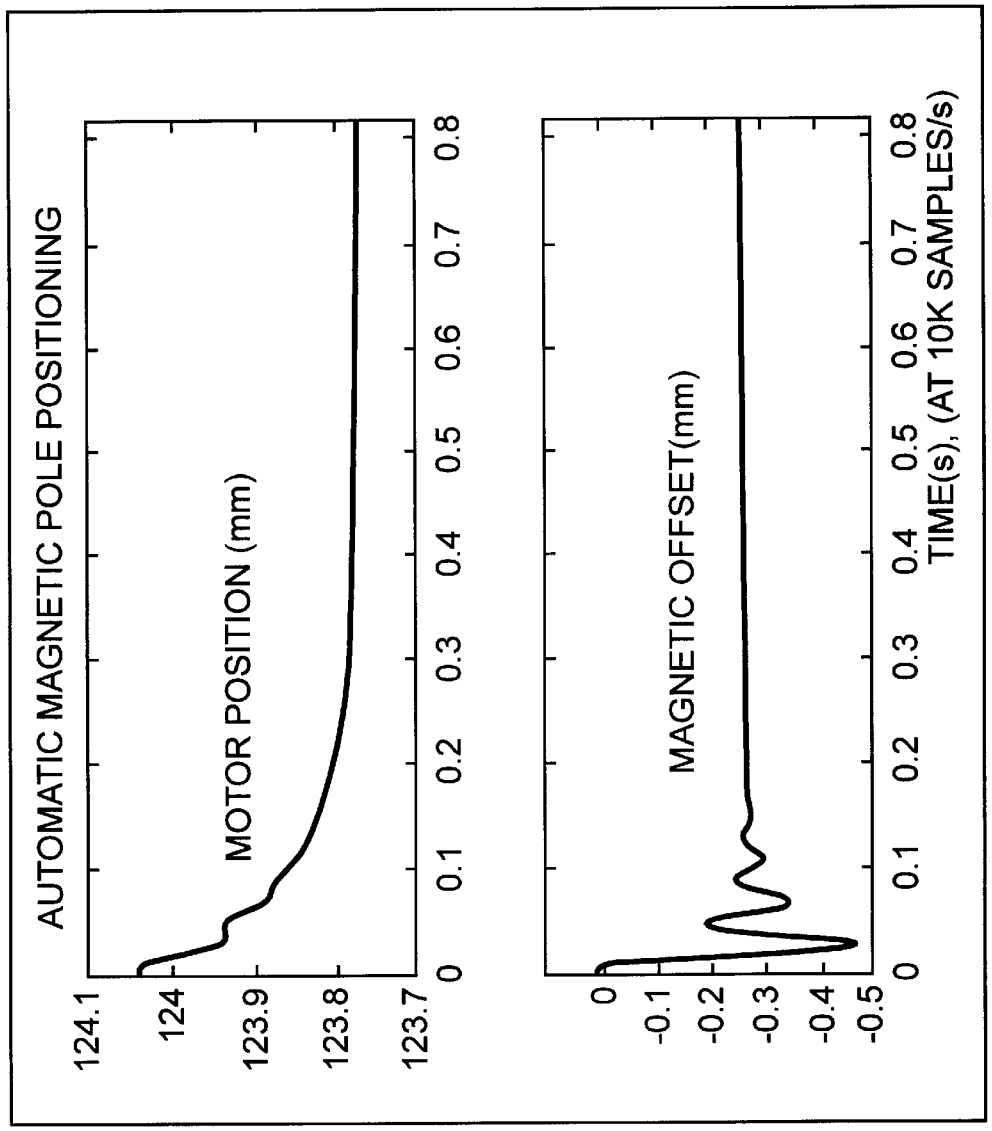

FIGS. 5A and 5B are waveform diagrams showing a relationship between linear position of a fixed-magnet and a track-moving winding motor upon startup consistent with the systems and methods of this invention. In FIG. 5A, for example, the DC motor's initial linear position is shown to be approximately 184.2 mm. Upon startup, systems and methods consistent with the present invention determine a final steady-state position of approximately 184.7 mm. As seen in the lower half of FIG. 5A, the corresponding magnetic offset changed from zero to 0.5 mm. The software and hardware of pole positioning device 110 subsequently use the magnetic_offset variable to provide the proper commutation current for operating motor 140 within a settling time of approximately 0.4 seconds. The lower half of the waveform depiction in FIG. 5A shows the magnetic offset error. This value is stored and used for subsequent commutation. FIG. 5B is a similar test of a startup and alignment sequence for a brushless, linear, DC motor consistent with this invention.

Those skilled in the art will recognize that various modifications and variations can be made in the preceding examples without departing from the scope or spirit of the invention.

The specification does not limit the invention. Instead it provides examples and explanations to allow persons of ordinary skill to appreciate different ways to practice this invention. The following claims define the true scope and spirit of the invention.

What is claimed is:

1. A method for determining a magnetic offset of a brushless, three-phase, DC motor having a set of magnets and a set of windings, the method comprising the steps of:

providing a first position value to a sensor position input of a commutation controller;

exciting the windings with a sinusoidal commutation signal output by the commutation controller, the commutation signal producing movement of the magnets;

measuring a distance between the windings and the magnets resulting from the relative movement; and determining, in response to a position feedback signal, a second position value such that the commutation signal output by the commutation controller causes the motor to enter a steady-state condition.

2. The method of claim 1, wherein the motor is coupled to a position sensor for measuring an angular distance between a magnetic and a winding, and wherein the measuring step includes the substeps of:

receiving the distance at the position sensor from the motor; and forwarding the position feedback signal to a feedback element coupled to the commutation controller, the feedback signal corresponding to the distance.

3. The method of claim 2, wherein the commutation controller includes a sensor position input, an offset input, and wherein the feedback element comprises a lead filter coupled to the offset input of the commutation controller, and wherein the determining step includes the substeps of:

comparing the first position value with the position feedback signal to produce the second position value;

forwarding the second position value to the offset input; and storing the second position value in a memory associated with the commutation controller when the motor reaches the steady-state condition.

4. The method of claim 3, wherein the commutation controller further includes a force level input and the step of providing a first position value includes the substeps of:

supplying a zero for the first position value;

supplying an initial offset value to the offset input of the commutation controller; and supplying a constant to the force level input of the commutation controller.

5. The method of 4, wherein the commutation controller is coupled to a plurality of signal conditioners, and wherein the exciting step includes the substeps of:

converting, with the signal conditioners, the commutation signal to a three-phase commutation current, each phase corresponding to the first position value, the initial offset value, and the constant supplied to the commutation controller; and receiving the three-phase commutation current at the set of windings.

6. A system for controlling a brushless DC motor having a plurality of windings and a plurality of magnets, the system comprising:

a position detection device configured to determine a magnetic offset value representing a relative distance between a magnet and the plurality of windings, and configured to use the magnetic offset value to produce a commutation current that allows the motor to output a maximum force, the position detection device including:

a commutation controller configured to provide a sinusoidal commutation signal to the plurality of windings, the commutation signal causing movement of the motor; and a lead filter, coupled to the commutation controller, configured to place the motor in a steady-state condition in response to a feedback signal; and a position sensor configured to receive a changing position signal resulting from movement of the motor, the changing position signal representing the relative distance between the magnet and the plurality of windings and corresponding to the feedback signal.

7. The system of claim 6, wherein the position detection device further comprises:

means for supplying a start position value to a position input of the commutation controller;

means for supplying an initial offset value to a magnetic offset input of the commutation controller; and means for supplying a constant to a force level input of the commutation controller.

8. The system of claim 7, wherein the lead filter comprises:

an input for receiving the changing position signal from the position sensor;

means for comparing the start position value with the changing position signal to produce the feedback signal; and means for forwarding the feedback signal to the offset input of the commutation controller.

9. The system of claim 8, wherein the position detection device further comprises:

a memory configured to store the feedback signal when the motor reaches the steady-state condition.

10. The system of claim 9, wherein the lead filter has a response, C(s), of $$C(s) = \frac{\phi}{x - x_0} = \frac{\text{gain } 10^4(s + 10)}{(s + 10^2)(s + 10^3)}$$

whereby s is a complex frequency according to the Laplace Transform equation.

11. The system of claim 10, wherein the motor produces a zero output force in the steady-state condition.

12. The system of claim 11, wherein the position sensor comprises an interferometer coupled between the motor and the position detection device.

13. The system of claim 12, wherein the motor is a brushless, three-phase, linear DC motor.

14. The system of claim 13, further comprising:

an interface module configured to convert the commutation signal into a three-phase sinusoidal commutation current.

15. In a system for controlling a brushless, three-phase, DC motor having a plurality of windings and a plurality of magnets, an apparatus comprising:

a commutation controller configured to provide a sinusoidal commutation signal to the plurality of windings; and a lead filter, responsive to a feedback signal, configured to determine a magnetic offset value corresponding to a difference between the feedback signal and an initial sensor position value supplied to the commutation controller, wherein the sinusoidal commutation signal places the motor in a steady-state condition when the magnetic offset value is supplied to the commutation controller.

16. The apparatus of claim 15, wherein the feedback signal comprises a linear position signal received from a position sensor coupled to the apparatus, the linear position signal resulting from a relative movement of the magnets to the windings.

17. The apparatus of claim 16, wherein the apparatus further comprises:

means for supplying the initial sensor position value to a position input of the commutation controller;

means for supplying an initial offset value to an offset input of the commutation controller; and means for supplying a constant to a force level input of the commutation controller.

18. The apparatus of claim 17, wherein the lead filter includes:

an input configured to receiving an angular position signal from the position sensor;

means for comparing the angular position signal with the initial sensor position value to generate the feedback signal; and an output configured to forward the feedback signal to the offset input of the commutation controller.

19. The apparatus of claim 18, wherein the lead filter has a response, C(s), of $$C(s) = \frac{\phi}{x - x_0} = \frac{\text{gain } 10^4(s + 10)}{(s + 10^2)(s + 10^3)}$$

whereby s is a complex frequency according to the Laplace Transform equation.

20. The apparatus of claim 19, wherein the motor is a brushless, three-phase, linear DC motor that has a zero output force in the steady-state condition, and wherein the apparatus further comprises:

a memory configured to store the feedback signal when the motor reaches the steady-state condition.

21. The apparatus of claim 20, the apparatus further including means for aligning the position sensor in accordance the stored feedback signal; and means for inputting a commutation current to the windings of the linear motor after aligning the position sensor.

22. The apparatus of claim 21, wherein the position sensor is an interferometer.

* * * * *

UNITED STATES PATENT AND TRADEMARK OFFICE
CERTIFICATE OF CORRECTION

PATENT NO.   : 6,046,555
DATED        : April 4, 2000
INVENTOR(S)  : Gabor Szoboszlay Page 1 of 1

It is certified that error appears in the above-identified patent and that said Letters Patent is hereby corrected as shown below:

<u>Title page, after item 76,</u>
Insert -- Assignee: NIKON COPORATION, Tokyo, Japan --

Signed and Sealed this

Thirty-first Day of July, 2001

Attest:

*Nicholas P. Godici*

NICHOLAS P. GODICI
*Attesting Officer*  *Acting Director of the United States Patent and Trademark Office*